2,963,447
CATALYSTS AND THEIR PREPARATION

Edwin F. Peters, Lansing, and Bernard L. Evering, Chicago, Ill., assignors to Standard Oil Company, Chicago, Ill., a corporation of Indiana No Drawing. Filed Oct. 31, 1957, Ser. No. 693,543

12 Claims. (Cl. 252—430)

This invention relates to novel catalysts which are useful in hydrocarbon conversions and to processes for the manufacture of said catalysts.

One object of our invention is to provide a solid catalysts by contacting an oxide of a metal of group 6a of the Mendeleeff Periodic Table with a solution of a soluble hydrocarbon aluminum compound in an inert solvent, such as a saturated or aromatic hydrocarbon or mixtures, in specified ratios under defined conditions. The solid catalysts are usually produced as powdered or colloidal dispersions in inert liquid media such as various hydrocarbons or equivalent solvents. Another object of our invention is to provide techniques for the preparation of said solid catalysts in a state of high activity. These and other objects of our invention will be apparent from the description and claims made herein.

Briefly, we have discovered that new solid compositions which are highly active catalysts for many purposes can be prepared by contacting an oxide of a metal of group 6a of the Mendeleeff Periodic Table, viz. an oxide of chromium, molybdenum, tungsten or uranium with a solution of a trihydrocarbon aluminum or dihydrocarbon aluminum hydride in an inert solvent. The aluminum compounds which are used can be characterized by the formula $AlR_3$, wherein R is selected from the class consisting of hydrogen and a monovalent hydrocarbon radical, said aluminum compound containing at least two of said hydrocarbon radicals. These aluminum compounds are readily handled as solutions in inert solvents such as liquid or liquefied hydrocarbons, particularly saturated or aromatic hydrocarbons or mixtures of two or more individual hydrocarbons of the same or different homologous series. The minimum concentration of aluminum compound in the solution is usually at least about 5 millimols per liter of solution, but it will be understood that the concentration of the aluminum compound can be varied as desired in individual catalyst preparations. The group 6a metal oxide substantially dehydrated, i.e. stripped of bound water or surface-bound hydroxyl groups, at some stage of manufacture precedent to contacting with the hydrocarbon aluminum compound. Water and surficial hydroxyl radicals in the group 6a metal oxide and/or catalyst supporting material react with the hydrocarbon aluminum compound. The hydrocarbon aluminum compound and group 6a metal oxide are contacted in molar ratio of at least about 0.1 and as high as 100, but usually between about 1 and about 10, with sufficient agitation to effect thorough contacting. The contacting is effected at temperatures of at least about −80° C. and below the temperature at which substantial thermal decomposition of the specific hydrocarbon aluminum compound occurs. Usually temperatures in the range of about 20° C. to about 200° C. are employed, preferably about 50° C. to about 175° C. Ordinarily, contacting can be effected simply at room temperature. The contacting period will depend to some extent on the other variables employed in the process of catalyst manufacture, especially the selected temperature and molar ratio of reactants, but is usually at least about 5 minutes and not necessarily greater than about 24 hours, usually about ½ to about 6 hours. The catalyst can be employed as a dispersion in the solvent employed for the hydrocarbon aluminum compound. Additional solvent can be added in the course of the contacting procedure to control temperature and for other reasons. The original solvent can be separated from the catalyst and replaced by another solvent. The catalyst can be stored as a dispersion in solvent in an inert atmosphere before use, preferably at low temperatures. Illustrations of our invention in greater detail are set forth hereinafter, together with illustrative examples of some uses of the new catalysts in hydrocarbon conversion processes.

The oxide catalyst ingredients employed in the present invention are derivatives of metals of group 6a (transition series members) of the periodic table, viz. Cr, Mo, W and U. The group 6a oxides are extended upon suitable supports and may be at least partially pre-reduced to sub-hexavalent metal oxides before use and preferably before contact with the hydrocarbon aluminum compound. Mixed oxides or complex oxygen compounds of group 6a metals can also be employed in the present process. Thus, in addition to the group 6a metal oxide, the catalysts may comprise oxides of copper, tin, zinc, nickel, cobalt, zirconium, vanadium, niobium, tantalum, etc. Mixed metal oxide catalysts can readily be made by calcining the desired metal salts of oxy acids of group 6a metals, wherein the group 6a metal appears in the anion, for example, salts of molybdic acid and the like.

The metal oxides are best used in substantially anhydrous form, i.e., they are substantially free of occluded water molecules or hydroxyl groups bound to the surface of the 6a oxide or its supporting material. Substantial dehydration can be effected by known methods such as heating the supported group 6a metal oxide to an elevated temperature in the range of about 100° C. to about 600° C. in air or gases such as $N_2$, $NH_3$, He or the like, which can be passed over said oxides as a continuous water-stripping stream during the heating procedure.

The group 6a metal oxide can be extended upon suitable supports (having surface areas, for example, between about 1 and about 1500 square meters per gram), for example, activated carbon; the difficultly reducible metal oxides such as alumina, magnesia, titania, zirconia, silica or their composites, e.g., synthetic aluminosilicates, clays and the like. In some instances it may be desired to employ a relatively low surface area support, of which a variety are known in the art, including tabular alumina, various fused silicates, silicon carbide, diatomaceous earths; various metals, preferably treated to produce a relatively thin surface coating of the corresponding metal oxide thereon, such as iron or steel containing a slight iron oxide coating or aluminum carrying a surface coating of aluminum oxide, e.g., as an anodized alumina. We may also employ relatively high surface area, relatively non-porous supports or carriers for the group 6a metal oxide such as kaolin, zirconium oxide, iron oxide pigments, carbon black or the like.

The relative proportion of support to the catalytic metal oxide is not critical and may be varied throughout a relatively wide range such that each component is present in amounts of at least approximately 1 weight percent. The usual metal oxide:support ratios are in the range of about 1:20 to 1:1, or approximately 1:10. We may employ metal oxide compositions composed of a supporting material containing about 1 to 80%, preferably about 5 to 35%, or approximately 10%, of molybdena or other group 6a catalytic metal oxide supported thereon.

The group 6a metal oxide can be incorporated in the support in any known manner, for example, by impregnation, coprecipitation, co-gelling and/or absorption techniques which are well known in the catalyst art. It may be desired to confine the group 6a metal oxide almost completely to a surface film on the support, rather than to achieve deep impregnation of the support with 6a oxide catalyst, in order to minimize mechanical disintegration of the catalyst by solid polymer.

In order to maximize the catalyst activity and reduce the requirements of the hydrocarbon aluminum compound, it is preferable to effect partial reduction of compositions comprising hexavalent group 6a metal oxides before use. The partial reduction and conditioning treatment of the solid metal oxide catalysts is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc. may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation can be varied from sub-atmospheric pressures, for example even 0.1 pound (absolute), to relatively high pressures up to 3000 p.s.i.g., or even more. The simplest reducing operation can be effected with hydrogen at about atmospheric pressure.

Reducing gases such as carbon monoxide and sulfur dioxide may be used under substantially the same conditions as hydrogen. Dehydrogenatable hydrocarbons are usually employed at temperatures of at least about 450° C. and not above 850° C. Examples of dehydrogenatable hydrocarbons are acetylene, methane and other normally gaseous paraffin hydrocarbons, normally liquid saturated hydrocarbons, aromatic hydrocarbons such as benzene, toluene, xylenes and the like, normally solid polymethylenes, polyethylenes or paraffin waxes, and the like.

The $AlR_3$ compounds which can be used in practicing our invention include compounds conforming to the general formula:

wherein $R_1$, $R_2$, and $R_3$ may be the same or different monovalent radicals selected from the class consisting of hydrogen and monovalent hydrocarbon radicals, but not more than one of said radicals is hydrogen. Examples of suitable R groups include an aryl radical, aliphatic hydrocarbon radical or derivative, such as alkyl, cycloalkyl-alkyl, cycloalkenyl-alkyl, aryl-alkyl, cycloalkyl, alkyl-cycloalkyl, aryl-cycloalkyl, cycloalkyl alkenyl, alkynyl, alkyl-aryl or cycloalkyl aryl radicals.

Specific examples of R groups for substitution in the above formula include methyl, ethyl, n-propyl, isopropyl, isobutyl, n-amyl, isoamyl, hexyl, n-octyl, n-dodecyl, and the like;

2-butenyl, 2-methyl-2-butenyl, allyl and the like;

alkynyl, such as acetylenyl, propargyl and the like;

cyclopentyl-methyl, cyclohexyl-ethyl, cyclopentyl-ethyl, methylcyclopentyl-ethyl, 4-cyclohexenylethyl and the like;

2-phenylethyl, 2-phenylpropyl, α-naphthyl-ethyl, methylnapthylethyl, and the like;

cyclopentyl, cyclohexyl, 2,2,1-bicyclo-heptyl, and the like;

methycyclopentyl, dimethylcyclopentyl, ethyl cyclopentyl, methylcyclohexyl, dimethylcyclohexyl, ethylcyclohexyl, isopropylcyclohexyl, 5-cyclopentadienyl and the like;

phenylcyclopentyl, phenylcyclohexyl, the corresponding naphthyl derivatives of cycloalkyl groups, and the like;

phenyl, tolyl, xylyl, ethylphenyl, xenyl, naphthyl, methylnaphthyl, dimethylnaphthyl, ethylnaphthyl, cyclohexylphenyl and other $AlR_3$ compounds of the type disclosed and suggested in German Patent 878,560.

Particularly suitable inert solvents for the hydrocarbon aluminum compounds are various classes of hydrocarbons or their mixtures which are liquid under the conditions of catalyst manufacture and are substantially inert under said conditions. By the term "inert solvents," we mean those which do not react chemically with the aluminum compounds and which do not interfere with the polymerization of olefins in the presence of catalysts prepared from the aluminum compounds. Certain classes of aliphatic hydrocarbons can be employed as solvents in the present process of catalyst manufacture. Thus we may employ various liquid or liquefied saturated hydrocarbons (alkanes and cycloalkanes). Either pure alkanes or cycloalkanes or commercially available mixtures, freed of catalyst poisons, may be employed. For example, straight run naphthas, mineral spirits or kerosenes containing alkanes and cycloalkanes can be used. Specifically, we may employ liquid or liquefied alkanes such as propane, butane, isobutane, n-pentane, n-hexane, 2,3-dimethylbutane, n-octane, iso-octane (2,2,4-trimethylpentane), n-decane, n-dodecane; cyclohexane, methylcyclohexane, dimethylcyclopentane, ethylcyclohexane, decalin, methyldecalins, dimethyldecalins and the like.

Mineral spirits is a carefully fractionated naphtha which we have treated with 98% and then with fuming (30% $SO_3$) sulfuric acid, neutralized and percolated with silica gel, then stored over bright sodium wire. The boiling range was 335-375° F. and the product was a mixture of alkanes and cycloalkanes, essentially free of alkanes and aromatic hydrocarbons.

Members of the aromatic hydrocarbon series, particularly the mononuclear aromatic hydrocarbons, viz., benzene, toluene, xylenes, mesitylene and xylene-p-cymene mixtures can also be employed. Tetrahydronaphthalene can also be employed. In addition, we may employ such aromatic hydrocarbons as ethylbenzene, isopropylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the reaction conditions, for example, 1-methylnaphthalene, 2-isopropylnaphthalene, 1-n-amylnaphthalene and the like, or commercially produced fractions containing these hydrocarbons.

We may also employ a liquid hydrocarbon reaction medium comprising liquid olefins, e.g., n-hexenes, cyclohexene, octenes, hexadecenes and the like.

The liquid hydrocarbon reaction medium should be freed of poisons before use in the present invention by acid treatment, e.g. with anhydrous p-toluenesulfonic acid, sulfuric acid, or by equivalent treatments, for example with aluminum halides, or other Friedel-Crafts catalysts, maleic anhydride, calcium, calcium hydride, sodium or other alkali metals, alkali metal hydrides, lithium aluminum hydride, hydrogen and hydrogenation catalysts (hydroforming or hydrofining), filtration through a column of copper grains or 8th group metal, etc., or by combinations of such treatments.

Various inert organic halogen compounds can also be used as solvents for the hydrocarbon aluminum compounds, e.g., completely halogenated alkanes such as $CF_2Cl$—$CF_2Cl$, $CFCl_2$—$CF_2Cl$, $CCl_4$ and the like; partially halogenated alkanes such as $CH_2Cl_2$ and $CHCl_3$; inert halogenated aromatic hydrocarbons such as chlorobenzene, o-dichlorobenzene, fluorobenzene and the like, or mixtures thereof.

The catalysts of this invention are reactive with oxygen, water, carbon dioxide, sulfur compounds, acetylene, allene; basic organic and inorganic oxygen and nitrogen compounds, and the like. The catalysts should be shielded from these materials as much as possible during preparation and use in catalytic conversion. Thus the catalysts are prepared, stored and used in an inert atmosphere such as the inert gases; pure, dry gaseous alkanes and the like.

We have not yet succeeded in identifying the catalysts as particular chemical individuals or complexes (stoichiomers) because their extreme reactivity limits the application of analytical techniques and the interpretation of analytical data.

The practical minimum concentration of the hydrocarbon aluminum compound in solvent is about 5 millimol per liter, but can be a much higher concentration, e.g. about 100 millimol per liter of solution or even more. Usually the concentration range of hydrocarbon aluminum compound in the solution is about 5 to about 50 millimols per liter of solvent.

Various techniques of contacting the solution of hydrocarbon aluminum compound with the group 6a metal oxide can be employed. Following are illustrations of various techniques of contacting. The metal oxide, usually in the form of a powder or granules, is introduced with stirring into the solution of aluminum compound while maintaining a desired temperature or temperature range by conventional methods; the metal oxide can be added continuously or in one or more batches. Another contacting method involves the preparation of a slurry or colloidal dispersion of the metal oxide in an inert solvent and the addition of this slurry or dispersion to the aluminum compound solution with agitation and temperature control. In an inverse addition technique, the solution of aluminum compound is added slowly with stirring and temperature control to a slurry or colloidal dispersion of the metal oxide in an inert solvent. An additional method which can be used is to introduce the metal oxide into the solution of aluminum compound in a ball mill or colloid mill or other grinding apparatus. These and other contacting methods, which will suggest themselves to one skilled in the art, can be used for the purposes of our invention. The contacting of aluminum compound and metal oxide can be effected in situ in the reactor, so that no transfer of catalyst is thereafter required. Optionally, the contacting of aluminum compound and metal oxide can be effected in the presence of one or more of the compounds which will thereafter be subjected to catalytic conversion with the resultant catalyst; particularly, contacting can be effected in the presence of alkenes such as ethylene, propylene or butylene.

The ultimate molar ratio of aluminum compound to metal oxide employed for the preparation of catalysts should be at least about 0.1 and can be as high as 100; more often the range of about 1 to about 20 is employed, preferably the range of about 2 to about 6. The temperature of contacting is usually at least about 0° C. and lower than temperatures at which substantial thermal decomposition of the specific aluminum compound occurs. Usually temperatures within the range of about 20 to about 200° C. can be used, preferably about 50 to about 175° C. or about room temperature. The contacting, as indicated above, is effected in an inert gaseous atmosphere or in an environment which is filled with inert liquid solvent. The pressure of inert gas which can be employed is usually at least about atmospheric pressure, to prevent leakage of oxygen and water vapor into the contacting system, but higher pressures up to about 100 or 200 p.s.i.g. can be used, although they are not usually necessary. The time of contacting can be at least about 5 minutes and is ordinarily within the range of about 15 minutes to about 4 hours. Usually the rate of interaction of the aluminum compound and metal oxide is high at room temperature or elevated temperatures, so that contacting periods in the range of even less than 1 minute to about 10 minutes can be conveniently employed.

The contacting of the group 6a metal oxide and the hydrocarbon aluminum compound results in some chemical interaction and/or complexing of the reactants. Thus in typical cases, the initial pale color of the metal oxide is observed to change or deepen to dark brown or black upon contact with the hydrocarbon aluminum solution and more or less hydrocarbon gas is evolved. Thus in some instances it was noted that one mol of triisobutyl aluminum reacts with one mol of $MoO_3$ (carried upon a silica gel support) and that the reaction evolved one mol of gases which contained isobutane and isobutylene. To some extent, reduction of the valence state of the metal of the group 6a metal oxide occurs and the solid catalyst composition contains hydrocarbon-metal bonds, apparently hydrocarbon-aluminum and possibly, also, hydrocarbon-group 6a metal. The interaction is still more obscure when it occurs in the presence of an added olefin.

One desirable method of preparing catalysts involves (1) contacting the group 6a metal oxide catalyst component with an amount of the hydrocarbon aluminum compound in excess of that required for complete reaction with the group 6a metal oxide (and catalyst support, if one is present) at the temperature of catalyst preparation, (2) thereafter separating the solution containing unreacted hydrocarbon aluminum compounds from the treated oxide, (3) followed by washing the treated oxide with a solvent for the hydrocarbon aluminum compound in one or more stages to effect substantially complete removal of unbound or unreacted hydrocarbon aluminum compound contained in the treated group 6a metal oxide. In some instances it has been found that catalyst prepared by this method, the so-called "backwash" method exhibits optimum activity for use in the polymerization of normally gaseous olefins to form normally solid polymers. Catalysts prepared by this technique have also been found in some instances to yield higher molecular weight polymers of gaseous n-alkenes than are obtained from catalysts otherwise prepared.

The catalysts of this invention can be employed for the polymerization of alpha olefins in the $C_2$–$C_{10}$ range, particularly the polymerization of alkyl ethylenes and isoalkyl ethylenes such as propylene, 1-butene, isopropyl ethylene, 4-methylpentene, 5-methylhexene or the like, e.g. styrene or nuclear derivatives of styrene. Both homopolymerization and copolymerization can be effected with these catalysts, usually at temperatures within the range of about 10° C. to about 230° C. and pressures ranging upwardly from atmospheric to any desired maximum pressure, usually between about 200 and about 5000 p.s.i.g. or about 500 to 1000 p.s.i.g.

The new solid compositions produced according to this invention can be employed for the hydrogenation of various alkenes, e.g. diisobutylene and/or other polymers or copolymers, at temperatures in the range of about 30° C. to 200° C. with hydrogen under pressures between about 200 and 2000 p.s.i.g. or even more.

In view of the high reactivity of the solid compositions produced by the present process, they can be used effectively to remove sulfur compounds and other polar compounds from hydrocarbon fractions such as naphthas, particularly in the last stage of the refining of such hydrocarbon oils to remove traces of organic compounds containing oxygen, nitrogen or sulfur to final values below 10 p.p.m.

In addition, the catalysts of this invention can be used to effect cracking reactions such as the conversion of propylene to ethylene under certain conditions and for isomerization reactions, such as the conversion of 1-butene to cis- and trans-2-butene, as will be illustrated hereinafter.

The following specific examples are introduced as illustrations of our invention and should not be interpreted as an undue limitation thereof. The ethylene employed in the polymerization reactions was a commercial product containing oxygen in the range of about 15 to 50 p.p.m. The benzene employed in some of the examples was a commercial product of analytical grade, free of thiophene, dried before use by contact with sodium hydride. The trimethyl aluminum promoter was prepared by the reaction of aluminum with methyl iodide (J.A.C.S. 68, 2204 (1946)) and was vacuum fractionated at 100/1 reflux ratio before use (boiling range 65–7° C. under 84 mm. of Hg). The triethyl aluminum was prepared by the reaction of diethyl mercury with aluminum. The triisobutyl aluminum was a commercial product (Hercules Co.) containing small proportions (about 5 wt. percent) of diisobutyl aluminum hydride.

Prior to use in polymerization the group 6a catalysts were calcined at temperatures within the range of about 430 to 570° C. at atmospheric pressure for substantial periods within the range of about 12 to about 20 hours.

Example 1

The 300 cc. steel autoclave was charged with 19 g. of calcined 8.5 wt. percent $MoO_3$-activated alumina, 105 g. of benzene and 3.4 g. of triethyl aluminum, which was charged under the surface of the benzene. A total of 77 g. of ethylene was charged to the autoclave. The contents of the autoclave were agitated and heated in one hour from room temperature to 121° C., then maintained at 121° C. for 3 hours. The initial pressure at room temperature was 600 p.s.i. and the maximum pressure was 1000 p.s.i. The reaction products were analyzed and it was found that 67 g. of ethylene had been converted to an extremely high molecular weight polymer which was essentially insoluble in boiling xylenes. It was further found that none of the ethylene had been converted to normally gaseous or normally liquid products.

When the molybdena was used without a support, markedly inferior polymerization was obtained as will be observed from the following data. The autoclave was charged with 13 g. of calcined $MoO_3$, 93 g. of n-heptane, 0.65 g. of triethyl aluminum and 32 g. of ethylene. The contents of the reactor were agitated and brought from room temperature to 240° C. over a period of 3 hours and then held at 240° C. for 2 hours. The initial pressure was 300 p.s.i. and rose to a maximum of 1100 p.s.i. The products were worked up and it was found that 18 g. of liquid polymers had been formed but only 0.4 g. (1.25 wt. percent based on ethylene charged) of a normally solid polymer. A very similar yield of solid polymer (0.5 g.) was obtained when xylenes solvent was substituted for n-heptane, the other reaction conditions being similar.

When triethyl aluminum alone was used as the catalyst, ethylene was not converted to a solid polymer as will appear from the following data. The reactor was charged with 105 g. of benzene, in which 2.6 g. of triethyl aluminum were dissolved. Then 50 g. of ethylene were introduced into the reactor and the contents were agitated while heating from room temperature to 171° C. The initial pressure was 600 p.s.i. and the maximum was 2000 p.s.i. The reaction period was 4 hours. The contents of the reactor were analyzed and it was found that 4 g. of liquid products had been produced but no gaseous or solid polymerization products were produced. Under similar operating conditions it was found that ethylene was likewise not converted to solid polymerization products by treatment in the presence of trimethyl aluminum.

Example 2

The autoclave was charged with 20 g. of 20 wt. percent $Cr_2O_3$ supported on activated alumina, 105 g. of benzene and 3.2 g. of triethyl aluminum. The reactor was then pressured with 72 g. of ethylene and the contents were heated with agitation from room temperature to 121° C. for 3 hours. The initial pressure was 600 p.s.i. and the maximum was 1000 p.s.i. The reaction products were worked up and it was found that 61 g. of a tough, solid, extremely high molecular weight polyethylene was produced which was essentially insoluble in boiling xylenes. None of the ethylene was converted to gaseous or liquid products.

Relatively inferior results were obtained in ethylene polymerization with unsupported $Cr_2O_3$ as will be seen from the following data. The autoclave was charged with 10 g. of calcined C.P. $Cr_2O_3$, 81 g. of n-heptane, 0.63 g. of trimethyl aluminum and 34 g. of ethylene. The contents of the reactor were heated with agitation to 104° C. over a reaction period of 3 hours. The initial pressure was 400 p.s.i. and the maximum was 1000 p.s.i. The ethylene was converted to 12 g. of a solid polymer.

Example 3

A very active catalyst for ethylene polymerization was prepared in the following manner. An 8.5 wt. percent molybdenum oxide ($MoO_3$) on activated alumina (20–35 mesh) was calcined in air at 540° C. for 5 hours. Then 9.7 g. of this composition (white to pale yellow) was charged to a glass-stoppered flask containing 200 ml. n-heptane and 2.03 g. of triisobutyl aluminum. The flask's contents were stirred by means of a magnetic stirrer at 27° C. for 19 hours during which time the solid catalyst turned black. This black solid catalyst was separated from the heptane solution by filtration through a sintered glass filter in apparatus specially designed to exclude air and moisture. The solid black catalyst was then washed five times with 50 ml. portions each of highly purified n-heptane. Titration of the original n-heptane charge for triisobutyl aluminum showed that the catalyst retained 1.49 g. thereof.

The catalyst was charged to a 300 cc. rocking bomb containing 100 ml. of purified n-heptane. Then ethylene was pressured into the bomb to 520 p.s.i.g. pressure at 27° C. The contents were heated to 133° C., but already at 70° C. polymerization was proceeding as evident from declining pressure with increasing temperature. The ethylene pressure was held at 600 to 1000 p.s.i.g. by charging additional ethylene as required. At the end of 4 hours, 94 g. of a solid polymer of ethylene was obtained.

Example 4

Propylene was polymerized to an extremely high molecular weight solid polymer, as follows. The reactor was a 300 cc. steel rocking bomb. It was charged with 44 g. 20–35 mesh cobalt molybdate-alumina, whose composition was 3 wt. percent CoO, 9 wt. percent $MoO_3$ and the remainder activated alumina, before the reducing treatment. The cobalt molybdate-alumina was calcined at 455° C. under a pressure of 1 mm. of mercury for 1.5 hours and then reduced, in the reactor, in a stream of hydrogen at 455° C., 600 p.s.i. for 1 hour. The reactor was then charged with 87 g. of benzene, 3 g. of triethyl aluminum and 77 g. of propylene. The reactor contents were agitated and heated to 104° C. for 24 hours, the maximum pressure being 440 p.s.i. The reaction yielded 10 g. of liquid polymers of propylene and 15 g. of a solid polymer of propylene having a specific viscosity $\times 10^5$ of 16,400, measured with a solution of 0.125 g. of polymer in 100 cc. of xylene at 110° C.

Example 5

The process of Example 1 is repeated, but the triethyl aluminum is replaced by its molar equivalent of triphenyl aluminum. The polyethylene product is worked up as in Example 1.

Example 6

A catalyst active for the conversion of propylene to ethylene and butene was prepared in the following manner. Twenty-five grams of 8.5 wt. percent molybdenum oxide (as $MoO_3$) on alumina composition (20–35 mesh)

was calcined in air at 430° C. for 1 hour. This calcined composition was then charged to a 300 cc. mild steel rocking bomb and, when cool, 100 ml. of purified n-heptane and 0.29 g. of triisobutyl aluminum were also charged. The bomb contents were mixed for 1.75 hours at 27° C., after which 75 g. of C.P. propylene was charged and the temperature was raised to 100° C. The reaction was allowed to proceed for 18 hours. At the end of this time the products comprised 0.6 g. butane, 11.6 g. butenes, 5.8 g. ethylene, 3.9 g. oils and 10.2 g. of solid polymer.

*Example 7*

An active catalyst for the conversion of 1-butene was prepared by calcining 11.0 g. of 7.5 wt. percent $MoO_3$ on $Al_2O_3$ in air at 510° C. for 4 hours. The calcined composition (10.8 g.) was then cooled under nitrogen of high purity and was then charged to a 300 cc. rocking bomb which contained 53 g. of purified benzene and 1.26 g. of triisobutyl aluminum. The bomb contents were heated from 40° C. to 120° C. over a period of 1 hour, after which 72 g. of C.P. 1-butene was charged. The bomb contents were now maintained at 120° C. for an additional 17 hours. The reaction products contained 18 g. isobutane, 1 g. isobutene, 14 g. trans-2-butene, 7 g. cis-2-butene, 2 g. oils, 4 g. solid polymer and 36 g. of 1-butene.

*Example 8*

A study was made of the "backwash" technique of catalyst preparation, as follows. In brief, a granular supported molybdena was treated at room temperature and atmospheric pressure with a substantial molar excess of a solution of triisobutyl aluminum in a solvent, with stirring. At the end of an ample period, to permit complete reaction between the molybdena (and the catalyst support) and the alkyl aluminum, the solid reaction product was washed several times with a solvent for the alkyl aluminum in order to remove unreacted alkyl aluminum. The "backwashed" catalyst thus prepared is highly reactive in olefin polymerization. Substantial advantages of these catalysts are that they can be prepared very readily without the need for fine dosage control and seem "automatically" to have the optimum $AlR_3/M_xO_y$ ratio (wherein $M_xO_y$ is a group 6a metal oxide) for olefin polymerization. The details follow: The reaction of triisobutyl aluminum and a molybdena-alumina was effected in a 500 cc. Erlenmeyer flask provided with stopcocks through which nitrogen was circulated to prevent access of air to the reactants. The reactor was charged with 200 cc. of pure, dry n-heptane and 8 cc. of a solution of commercial triisobutyl aluminum which was shown by titration analysis to contain, originally, 2.03 g. of triisobutyl aluminum. This and other titration analyses indicated hereinafter were performed by withdrawing an aliquot from the flask into an excess of 0.103 N hydrochloric acid and back-titrating with 0.104 N aqueous NaOH to a methyl orange end point. After removal of the first aliquot for titration, the reactor contained exactly 10 millimols of triisobutyl aluminum. The reactor was next charged with 9.7 g. of 8.5 wt. percent $MoO_3$ supported on $Al_2O_3$ (20 to 35 mesh per inch) which had been calcined in air for 5 hours at 1000° F. and cooled to room temperature in a dry, inert atmosphere. The contents of the reaction flask were stirred magnetically for 30 minutes. Within the first 5 minutes, the color of the $MoO_3$—$Al_2O_3$ changed from white to yellow to brown and finally to a color ranging from dark brown to black. Titration analysis at the end of 30 minutes of contacting showed that 4.75 millimols of triisobutyl aluminum were consumed by reaction with the 5.73 millimols of $MoO_3$. The reaction mixture was then allowed to stir for an additional 18.5 hours, at which time titration analysis indicated that 7.53 millimols of triisobutyl aluminum had been consumed by the 5.73 millimols of $MoO_3$ and, to some extent, probably by reaction with the $Al_2O_3$ catalyst support. The catalyst thus prepared was transferred to washing equipment wherein it was washed free of unreacted triisobutyl aluminum by extraction five times with 50 cc. portions each of pure, dry n-heptane. The resultant catalyst was then transferred to a steel rocking bomb of 300 cc. capacity and ethylene was polymerized with the catalyst. The charge to the rocker bomb was 9.7 g. of the molybdena-alumina catalyst which had reacted with 1.49 g. of triisobutyl aluminum, 65 g. of pure, dry n-heptane and 103 g. of ethylene. The bomb was charged under an inert gas atmosphere. The contents were heated with stirring from room temperature to 132° C. The initial pressure was 520 and the final pressure was 950 p.s.i.g., after 4 hours of operation. The polymerization yielded 94 g. of a solid polymer of ethylene having the density (23° C.) of 0.9620 and melt viscosity at 145° C. of $1.5 \times 10^7$ poises (method of Dienes and Klemm, J. Appl. Phys. 17, 458 (1946)).

This application is a continuation-in-part of our application for United States Letters Patent, Serial No. 504,684, which was filed on April 28, 1955, now U.S. Patent No. 2,824,089.

Having thus described our invention, what we claim is:

1. A solid composition produced by contacting a solid material consisting essentially of a minor proportion by weight of an oxide of a metal of group 6a of the Mendeleeff Periodic Table extended upon a major proportion by weight of an inert solid catalyst support with a solution, in an inert solvent, of a hydrocarbon aluminum compound having the formula $AlR_3$, wherein R is selected from the class consisting of hydrogen and monovalent hydrocarbon radicals, said aluminum compound containing at least two of said hydrocarbon radicals, the molar ratio of said aluminum compound to said group 6a metal oxide being at least about 0.1.

2. The composition of claim 1 wherein said oxide is an oxide of molybdenum and said aluminum compound is a trihydrocarbon aluminum.

3. The composition of claim 1 wherein said oxide is an oxide of molybdenum and said aluminum compound is a trialkyl aluminum.

4. The composition of claim 1 wherein said oxide is molybdenum trioxide and said aluminum compound is triisobutyl aluminum.

5. A solid catalyst produced by contacting a solid material consisting essentially of a minor proportion by weight of a calcined hexavalent oxide of a metal of group 6a of the Mendeleeff Periodic Table extended on a major proportion by weight of an inert solid catalyst support with a solution, in an inert solvent, of a hydrocarbon aluminum compound having the formula $AlR_3$, wherein R is selected from the class consisting of hydrogen and monovalent hydrocarbon radicals, said aluminum compound containing at least two of said hydrocarbon radicals.

6. The catalyst of claim 5 wherein said oxide is partially reduced by treatment with a reducing gas before said contacting.

7. The catalyst of claim 5 wherein said oxide is partially reduced by treatment with hydrogen at a temperature between about 450° C. and about 650° C. before said contacting.

8. A process for the preparation of a solid catalyst which comprises contacting a solid material consisting essentially of a minor proportion by weight of an oxide of a metal of group 6a of the Mendeleeff Periodic Table extended upon a major proportion by weight of an inert solid catalyst support with a solution, in an inert solvent, of a hydrocarbon aluminum compound having the formula $AlR_3$, wherein R is selected from the class consisting of hydrogen and monovalent hydrocarbon radicals, said aluminum compound containing at least two of said hydrocarbon radicals, the molar ratio of said aluminum compound to said group 6a metal oxide being at least about 0.1.

9. A process for the preparation of a solid catalyst which comprises contacting a solid material consisting essentially of a minor proportion by weight of a calcined hexavalent oxide of a metal of group 6a of the Mendeleeff Periodic Table extended upon a major proportion by weight of an inert solid catalyst support with a hydrocarbon solution of a hydrocarbon aluminum compound having the formula $AlR_3$, wherein R is selected from the class consisting of hydrogen and monovalent hydrocarbon radicals, said aluminum compound containing at least two of said hydrocarbon radicals, the molar ratio of said aluminum compound to said group 6a metal oxide being at least about 0.1.

10. The process of claim 9 wherein said oxide is partially reduced by treatment with a reducing gas before said contacting.

11. A process for the preparation of a solid catalyst, which process comprises contacting a solid material consisting essentially of a minor proportion by weight of an oxide of a metal of group 6a of the Mendeleeff Periodic Table extended upon a major proportion by weight of an inert solid catalyst support with a solution, in an inert solvent, of a hydrocarbon aluminum compound having the formula $AlR_3$, wherein R is selected from the class consisting of hydrogen and monovalent hydrocarbon radicals, said solution containing said aluminum compound in a molar ratio to said oxide exceeding 1.0, thereafter withdrawing said oxide from said contacting operation and washing said oxide free of extractable aluminum compound with an inert solvent for said aluminum compound.

12. The process of claim 11 wherein said solid material is molybdena supported on activated alumina and said hydrocarbon aluminum compound is triisobutyl aluminum.

References Cited in the file of this patent

UNITED STATES PATENTS

| | | |
|---|---|---|
| 2,699,457 | Ziegler | Jan. 11, 1955 |
| 2,731,453 | Field | Jan. 17, 1956 |
| 2,824,089 | Peters | Feb. 18, 1958 |